US012612900B2

(12) United States Patent
Jacobsen

(10) Patent No.: US 12,612,900 B2
(45) Date of Patent: Apr. 28, 2026

(54) METHOD FOR CRANELESS WIND TURBINE PITCH BEARING INDEXING

(71) Applicant: Inventus Holdings, LLC, Juno Beach, FL (US)

(72) Inventor: Eric M. Jacobsen, Jensen Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 18/782,302

(22) Filed: Jul. 24, 2024

(65) Prior Publication Data

US 2026/0028967 A1     Jan. 29, 2026

(51) Int. Cl.
F03D 80/70          (2016.01)
F03D 80/50          (2016.01)

(52) U.S. Cl.
CPC .............. F03D 80/70 (2016.05); F03D 80/50 (2016.05); F05B 2240/916 (2013.01)

(58) Field of Classification Search
CPC .......... F03D 80/50; F03D 80/70; F03D 13/10; F05B 2230/80; F05B 2230/608; F05B 2240/916
See application file for complete search history.

(56) References Cited

U.S. PATENT DOCUMENTS

| | | | |
|---|---|---|---|
| 9,777,705 B2 | 10/2017 | Neumann et al. | |
| 10,508,645 B2 | 12/2019 | Johnson et al. | |
| 10,788,015 B2 | 9/2020 | Ebbesen et al. | |
| 2017/0067437 A1* | 3/2017 | Neumann ............. | F03D 1/0658 |

* cited by examiner

*Primary Examiner* — Christopher J. Besler
(74) *Attorney, Agent, or Firm* — Fish & Richardson P.C.

(57)          ABSTRACT

A method for re-indexing a wind turbine bearing coupled to a blade and having damaged teeth driven by a motor includes installing temporary support structures between the turbine bearing and the blade to decouple a portion of the turbine bearing having the damaged teeth from the blade. The turbine bearing is re-indexed and the temporary support structures removed. The re-indexed turbine bearing is recoupled to the blade.

19 Claims, 14 Drawing Sheets

400

402 — Installing Temporary Support Structures Between The Turbine Bearing And The Blade To Decouple A Portion Of The Turbine Bearing Having The Damaged Teeth From The Blade 404 — Re-Indexing The Turbine Bearing 406 — Removing The Temporary Support Structures 408 — Recoupling The Re-Indexed Turbine Bearing To The Blade

METHOD FOR CRANELESS WIND TURBINE PITCH BEARING INDEXING

TECHNICAL FIELD

The present invention relates generally to wind turbines, and specifically to a craneless re-indexing device for addressing bearing wear in a wind turbine.

BACKGROUND

A wind turbine typically includes a plurality of blades connected to a nacelle through a rotor hub and a control mechanism to control the pitch of the blades. The wind turbines adjust rotor blade pitch for several reasons, namely, to improve the wind turbine efficiency by adapting the blade aerodynamics with wind speed changes. Another reason is to take the blades to an unloaded or feathered condition in the event that wind speed exceeds the maximum safe rated speed or in the event of fault conditions.

To perform the pitch, each blade is provided with a bearing between the hub and the blade, and some sort of mechanism to provide the force for pitching the blade and maintaining it in a given position, e.g., a motor driving a gear connected to the bearing for rotating the same. This pitching arrangement enables each blade to be turned approximately 120° around its rotational axis.

SUMMARY

In one example, a method for re-indexing a wind turbine bearing coupled to a blade and having damaged teeth driven by a motor includes installing temporary support structures between the turbine bearing and the blade to decouple a portion of the turbine bearing having the damaged teeth from the blade. The turbine bearing is re-indexed and the temporary support structures removed. The re-indexed turbine bearing is recoupled to the blade.

In another example, a method for re-indexing at least one wind turbine bearing coupled to a blade and having damaged teeth driven by a motor includes orienting the blade in a downward pointing direction. A longitudinal gap is formed between the blade and the bearing under gravity assist such that the blade is suspended from the wind turbine. The turbine bearing is re-indexed. The longitudinal gap is closed for re-coupling the re-indexed turbine bearing to the blade.

Other objects and advantages and a fuller understanding of the invention will be had from the following detailed description and the accompanying drawings.

DETAILED DESCRIPTION

The present invention relates generally to wind turbines, and specifically to a craneless re-indexing device for addressing bearing wear in a wind turbine. The wind turbine bearing to be repaired by the present invention can be, for example, a pitch bearing, a yaw bearing and/or a drive bearing. The present disclosure offers a distinct technical advantage by offering an easy, inexpensive means of re-establishing functional torque transfer between the drive motor and the toothed inner ring of the bearing when one or more teeth become damaged.

Figure 1:
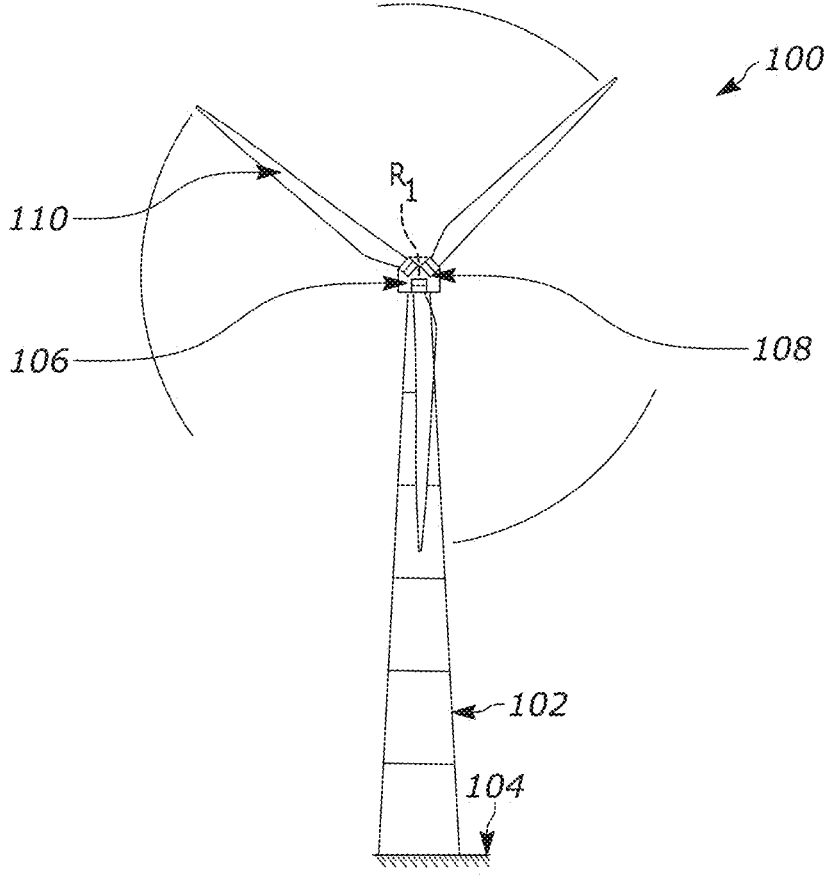
FIG. 1 is a perspective view of an example wind turbine in an aspect of the present invention.

FIG. 1 illustrates an example wind turbine 100 in accordance with an aspect of the present invention. The wind turbine 100 can be an offshore wind turbine or an onshore wind turbine. The wind turbine 100 includes a tower 102 extending vertically from a foundation 104 or base 104 on land or off-shore. A nacelle 106 is mounted at the upper end of the tower 102. A rotor hub 108 is mounted at the front end of the nacelle 106 and is rotatable about an axis $R_1$ relative to the nacelle in a generally vertical plane. Turbine blades 110 extend radially from the hub 108 and rotate with the hub in response to wind impinging upon the blades.

Figure 2:
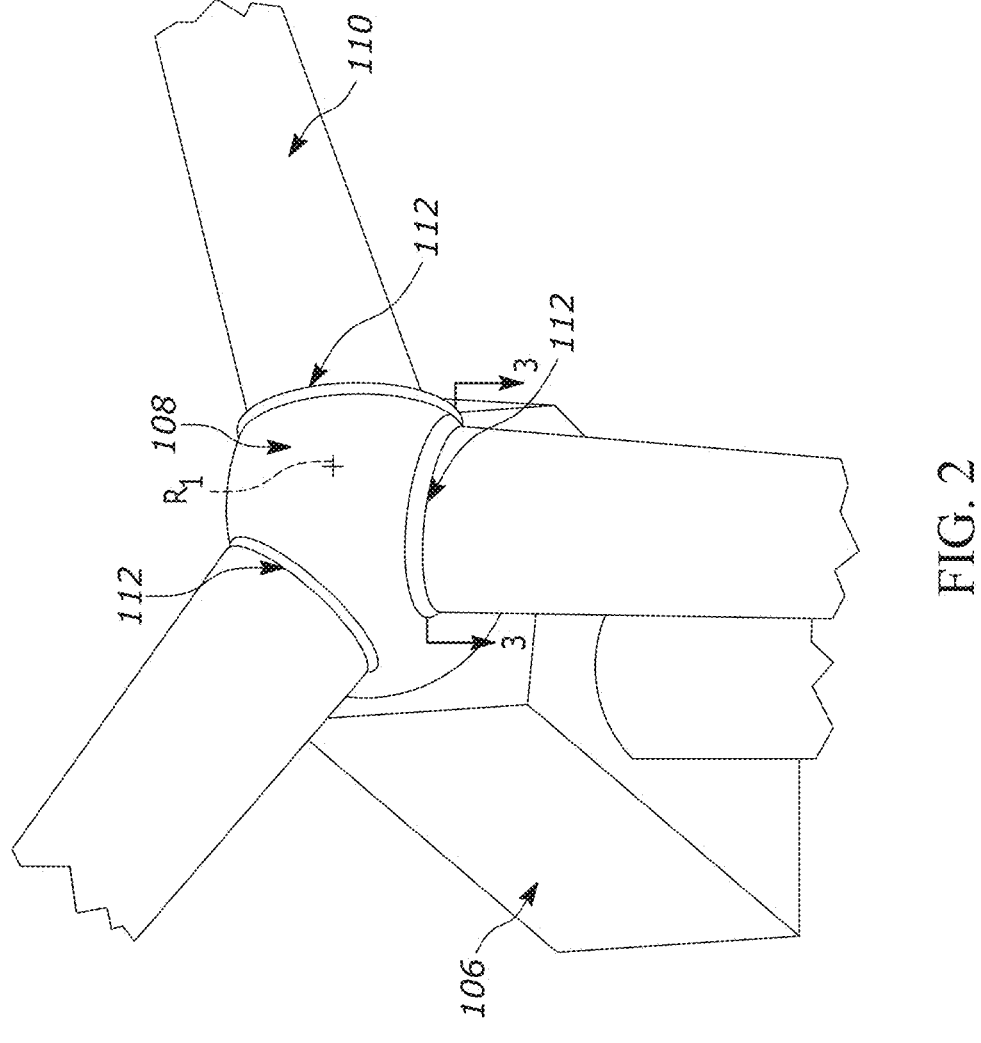
FIG. 2 is an enlarged view of a portion of the wind turbine of FIG. 1.

Referring to FIG. 2, each of the blades 110 is connected to the hub 108 through a respective pitch bearing 112. Each bearing 112 is configured to rotate its corresponding blade 110 between different pitch angles relative to an axis $R_2$. The bearing 112 includes concentric inner and outer rings 114, 116. The outer ring 116 is fixed to the hub 108. The inner ring 114 is fixed to the blade 110 and rotatably coupled to the outer ring 116. To this end, a series of rolling elements 117 are provided between and interface with the rings 114, 116 to facilitate smooth relative rotation between the rings about the axis $R_2$. The rolling elements 117 can be formed as spherical balls made of steel and/or other suitable materials. Alternatively, the rolling elements 117 can be formed as rollers. These rolling elements can be selectively hardened to provide long operating life and smooth rotation between inner and outer rings 114, 116. Lubrication can also be provided between the rings 114, 116 to reduce friction therebetween during operation.

Figure 4A:
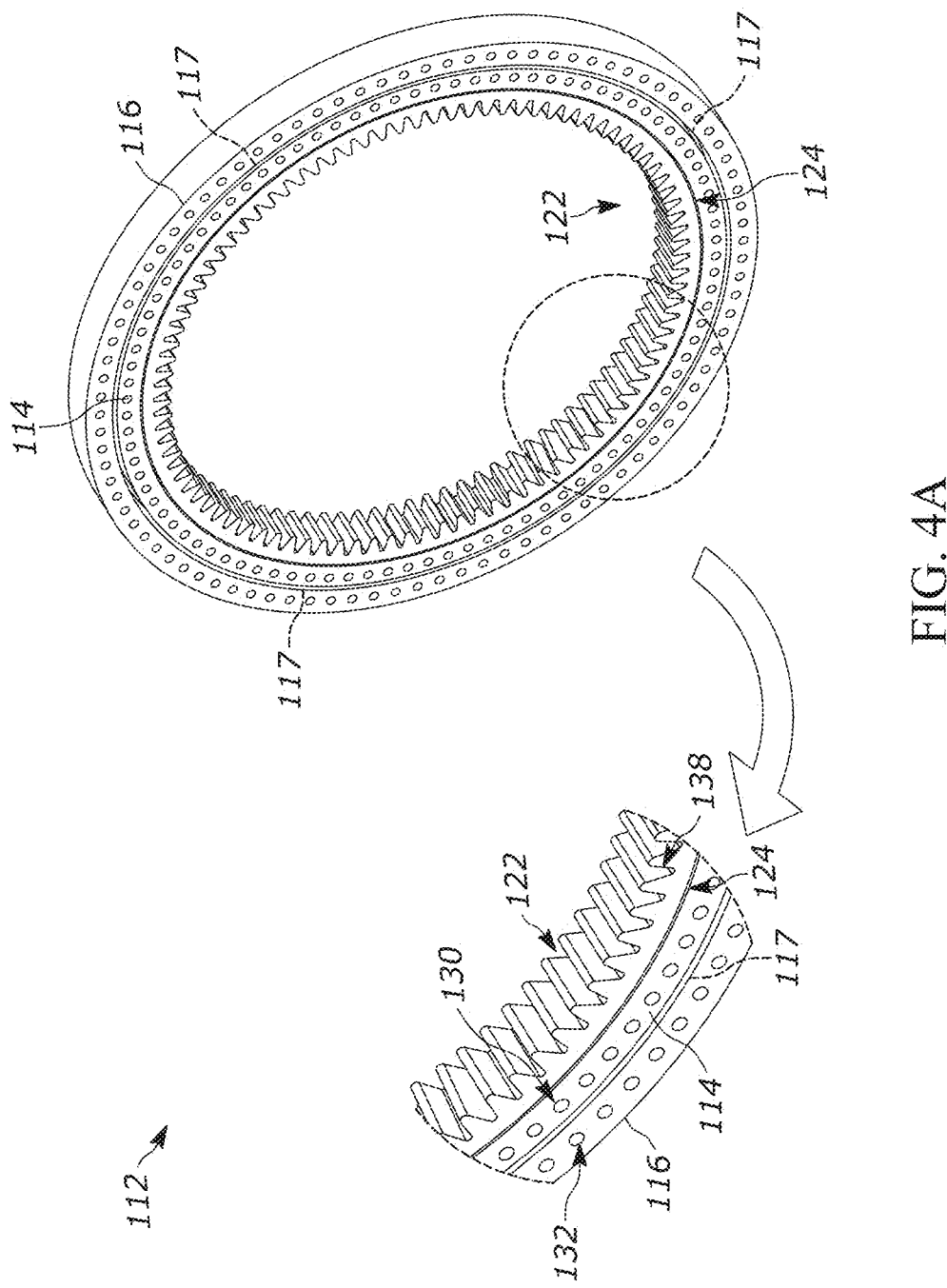
FIG. 4A is a perspective and enlarged view of a pitch bearing of the wind turbine.
Figure 4B:
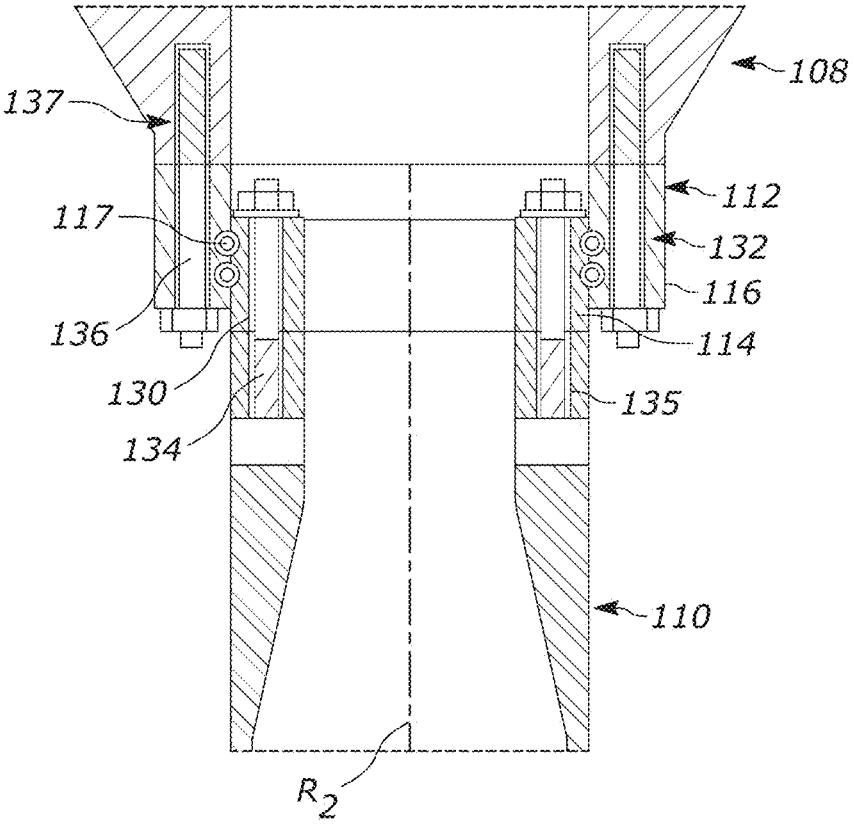
FIG. 4B is a section view of a connection between the pitch bearing and a blade.

In one example shown in FIG. 4B, openings 130 extend through the inner ring 114 and are arranged in an annular pattern around the inner ring. Openings 132 also extend through the outer ring 116 and are arranged in an annular pattern around the outer ring. The openings 130 extend parallel to the openings 132 with the openings 130, 132 being arranged in associated pairs about the bearing 112.

Figure 3:
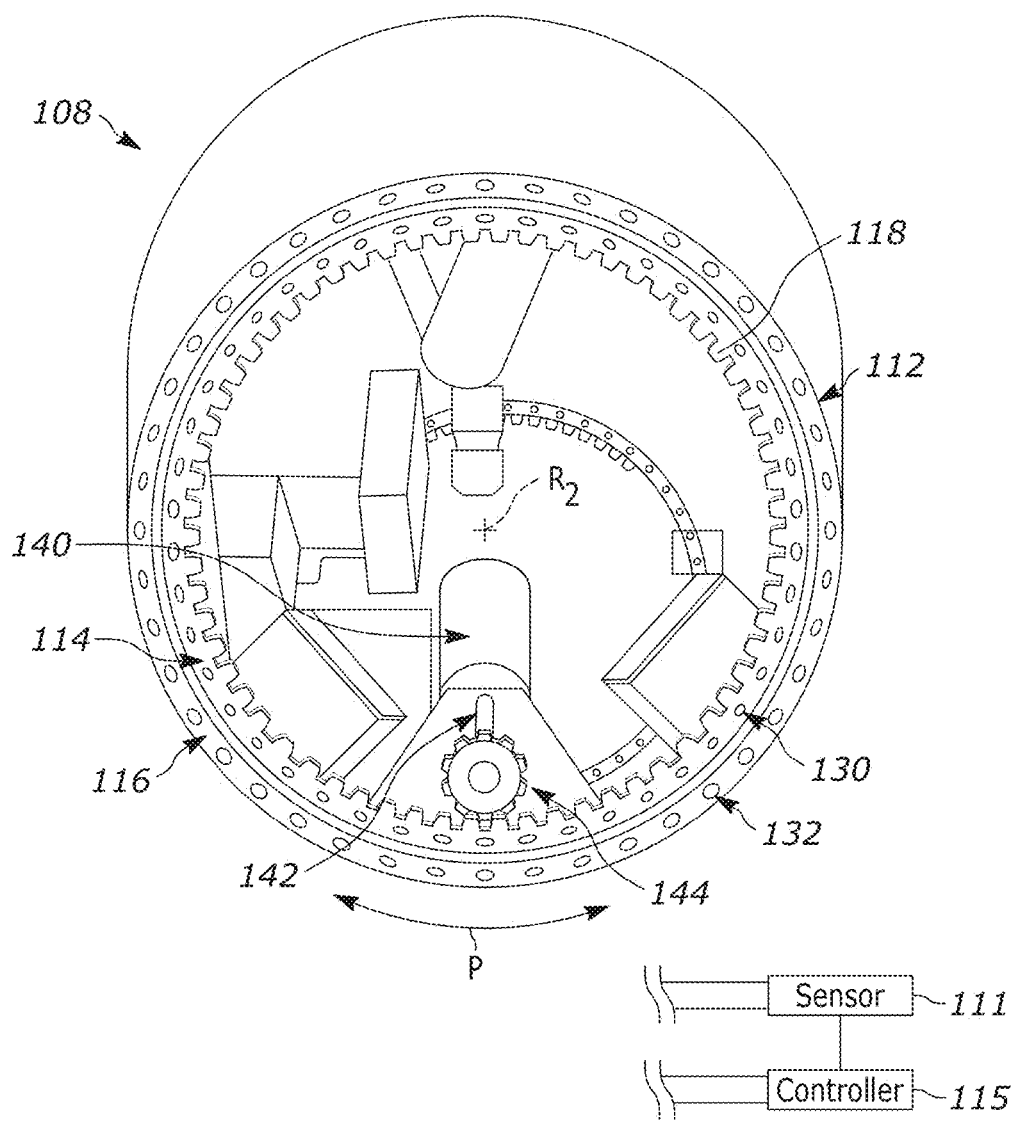
FIG. 3 is a section view of FIG. 2 taken along line 3-3.

Turning to FIG. 3, a gear ring 118 is provided on the inner ring 114. The gear ring 118 can be integrally formed with the inner ring 114 or secured thereto with fasteners, welding, etc. It will be appreciated that the gear ring 118 can completely encircle the rotation axis $R_2$ (as shown) or extend less than 360° around the axis (not shown). In any case, the gear ring 118 has a radially inner side 122 and a radially outer side 124 (see also FIG. 4A). Teeth 138 extend from the radially inner side 122 towards the axis $R_2$. The radially outer side 124 abuts the inner ring 114.

Threaded bolts 134 extend through the openings 130 in the inner ring 114 and into threaded openings 135 in the blade 110 such that the blade and the inner ring are fixed together for rotation relative to the outer ring 118 and hub 108 secured thereto. In other words, the blade 110 is coupled directly to the inner ring 114 such that the weight of the blade is borne primarily by the inner ring. Threaded bolts 136 extend through the openings 132 in the outer ring 116 and into threaded openings 137 in the hub 108 such that the hub and the outer ring are fixed together.

Returning to FIG. 3, a motor 140 is provided within the hub 108 and includes a shaft 142 bearing an output gear 144 rotatable with the shaft 142. The output gear 144 is meshed with the teeth 138 on the gear ring 118 such that rotation of the motor 140 drives the output gear 144 which, in turn, rotates the inner ring 114 relative to the outer ring about the axis $R_2$. More specifically, rotating the output gear 144 causes the gear ring 118 to move along a circumferential path P, thereby rotating the inner ring 114 secured thereto and changing the pitch of the blade 110 associated with that particular bearing 112.

One or more sensors 111 can be provided on the nacelle 106 for monitoring wind speed and/or wind direction during operation of the wind turbine 100. A controller 115 is connected to the sensors 111 and the motor 140. The motor 140, in response to signals sent by the sensors 111 indicative of the wind speed and/or wind direction, can be operated by the controller 115 to adjust the pitch angle(s) of the blade(s) 110 during operation of the wind turbine 110 to help maximize its efficiency.

It will be appreciated that a separate motor 140 and gear ring 118 is associated with each blade 110 such that the pitch angle of each blade can be individually adjusted. The same controller 115 and sensors 111 can be used to individually control each motor 140. With this in mind, the circumferential or arcuate extent of any particular gear ring 118 dictates the degree to which the blade 110 associated therewith can change its pitch because the blade is coupled to the inner ring 114 on which the gear ring resides. As shown, the gear ring 118 is a ring and, thus, the blade 110 connected thereto can rotate completely about its axis $R_2$. It will be appreciated that each gear ring 118 can extend over the same arcuate angle as any other gear ring or a different arcuate angle.

Figure 5:
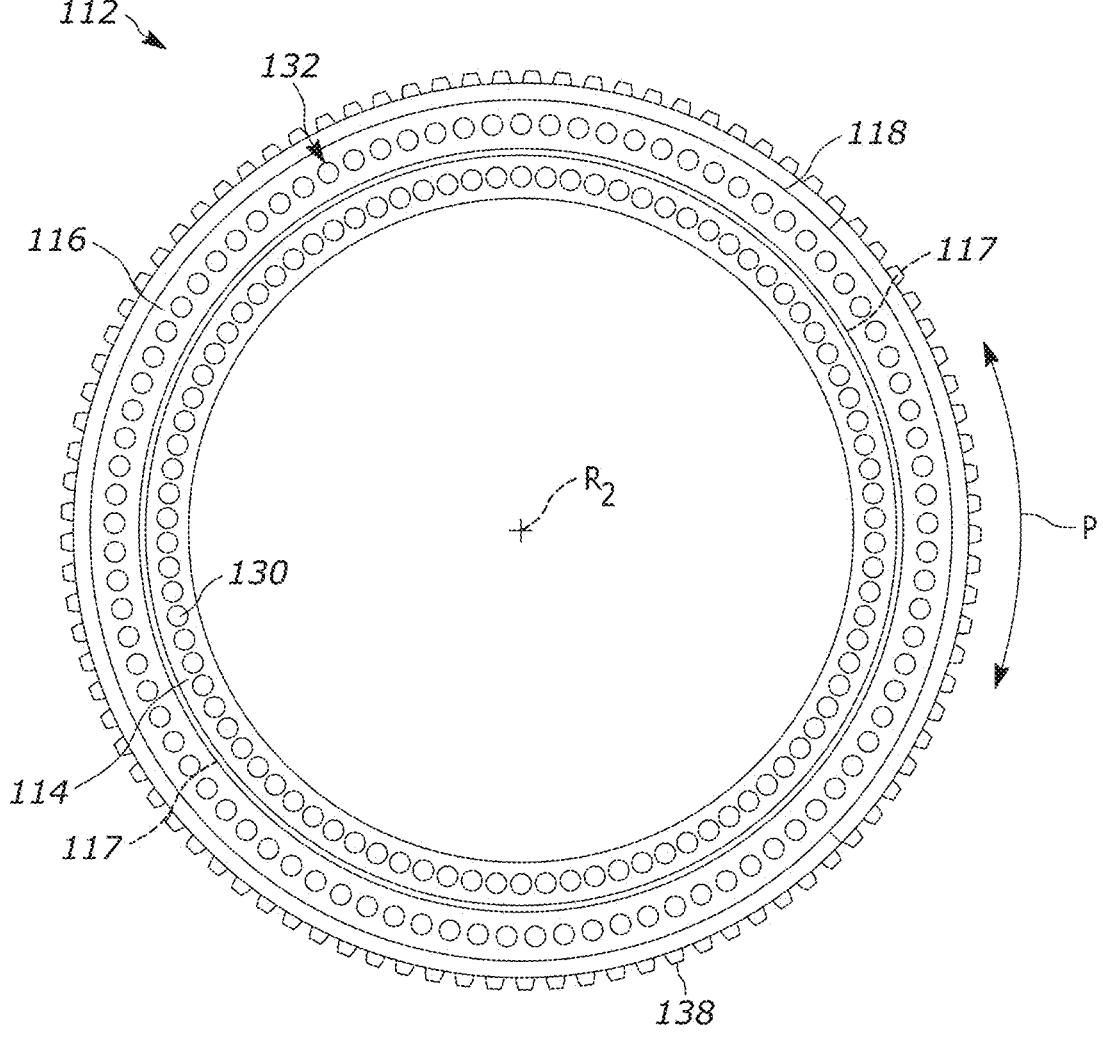
FIG. 5 is a side view of an alternative pitch bearing.

It will also be appreciated that the gear ring 118 can also be provided on the radially outer side of the outer bearing 116, as shown in FIG. 5. In this configuration, the teeth 138 extend radially outward from the outer ring 116 relative to the axis $R_2$. The motor 140, shaft 142, and output gear 144 (not shown) are then positioned relative to the hub 108 to enable the output gear to mesh with the teeth 138 on the outer ring 116. In this configuration, the threaded bolts 136 couple the blade 110 directly to the outer ring 116 such that the weight of the blade is borne primarily by the outer ring. Consequently, the blade 110 and outer ring 116 move together as one unit in response to rotation of the output gear 144. The motor 140 can rotate the outer ring 116 relative to the inner ring 114 and about the axis $R_2$ to adjust the pitch of the blade secured to that particular outer ring. In this example, the same configuration can be utilized for the remaining bearings 112.

In either configuration, it will be appreciated that over time, one or more of the teeth 138 on the bearing 112 can become damaged, e.g., worn, chipped, cracked, corroded, etc. As a result, the interface between the motor output gear 144 and the teeth 138 can become compromised. With this in mind, the present invention provides a temporary support device or structure 160 for allowing the bearing 112 to be re-indexed while still being connected to the wind turbine 100. Re-indexing of the bearing 112 allows the wind turbine 100 to maintain a reliable, torque transferring connection between the output gear 144 and the teeth 138.

Figure 6:
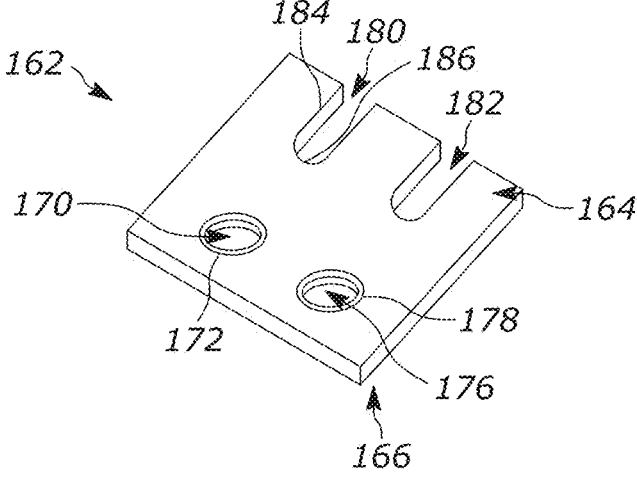
FIG. 6 is a perspective view of the temporary support structure in accordance with the present invention.

Turning to FIG. 6, in one example the structure 160 constitutes a series of spacers 162, each having a first side 164 and a second side 166. A first passage or opening 170 extends entirely through the spacer 162 from the first side 164 to the second side 166. The first opening 170 includes a countersink 172 extending into the first side 164. A second passage or opening 176 extends entirely through the spacer 162 from the first side 164 to the second side 166. The second opening 176 includes a countersink 178 extending into the first side 164.

A first notch 180 extends laterally through the spacer 162 towards the first opening 170. A second notch 182 extends laterally through the spacer 162 towards the second opening 172. Each notch 180, 182 includes a linear portion 184 and a circular or rounded portion 186. The notches 180, 182 are longitudinally aligned with the respective openings 170, 176. It will be appreciated that the spacer 162 can include more or fewer openings than those shown, but the number of openings and lateral notches will be the same in any configuration.

Figure 7A:
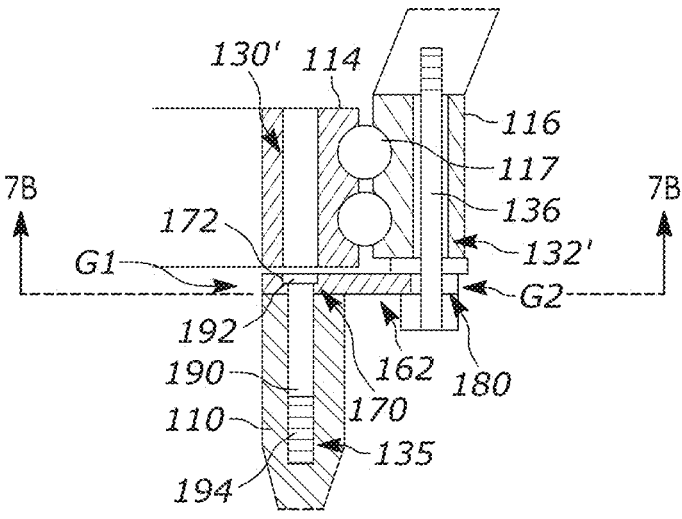
FIG. 7A is a section view of a portion of the wind turbine having the temporary support structure of FIG. 6.

As shown in FIG. 7A, to install the spacers 162, a series of adjacent bolts 134 are first removed along an arc sufficient to create a longitudinal gap (indicated at "G1") between the inner ring 114 and the blade 110. The size of the gap G1 is sufficient to receive one of the spacers 162, with the first side 164 facing the inner ring 114 and the second side 166 facing the blade 110. For the sake of clarity, the pair of adjacent openings 130 whose bolts 132 were removed to create the gap G1 are denoted 130'.

Before inserting the spacer 162 into the gap G1, the bolts 136 in the openings 132 that are radially aligned with the openings 130' are loosened sufficient to create a similar longitudinal gap (indicated at "G2") between the outer ring 116 and the head of the bolt 136. It will be appreciated that the openings 130, 132 in the inner and outer rings 114, 116 may need to be radially aligned with one another during or following creation of the gaps G1, G2. That said, the current rotational position of the blade 110 during loosening of the bolts 136 can affect how the gap G2 is formed.

In particular, the more the terminal end of the blade 110 is pointed downward towards the ground, the greater the effect gravity will have on naturally allowing the blade to move downward and away from the outer ring 116 to help form the gap G2. With this in mind, it will be understood that any orientation of the blade 110 in which the terminal end points or extends below a plane extending parallel to the ground constitutes a "downward pointing" blade.

In any case, once the gaps G1, G2 are formed, the spacer 162 is inserted therein. More specifically, the passages 170, 176 are aligned with the respective pair of openings 130' in the inner ring 114 while laterally inserting the loosened bolts 136 into the notches 180, 182. A pair of temporary threaded fasteners 190 are then inserted through the openings 130' and into the spacer 162. Each fastener 190 includes a head 192 and a threaded shaft 194 extending therefrom. Both the head 192 and shaft 194 have smaller diameters than the diameter of the openings 130'.

With this in mind, each of the two fasteners 190 is passed through one of the openings 130' and the shaft 194 threaded to the associated opening 135 in the blade 110. This positions the heads 192 within the countersinks 172, 178 and clamps the spacer 162 and the blade 110 together. The bolts 136 associated with the openings 132' are then tightened to clamp the bolts 136, spacer 162, and hub 108 together.

Figure 7B:
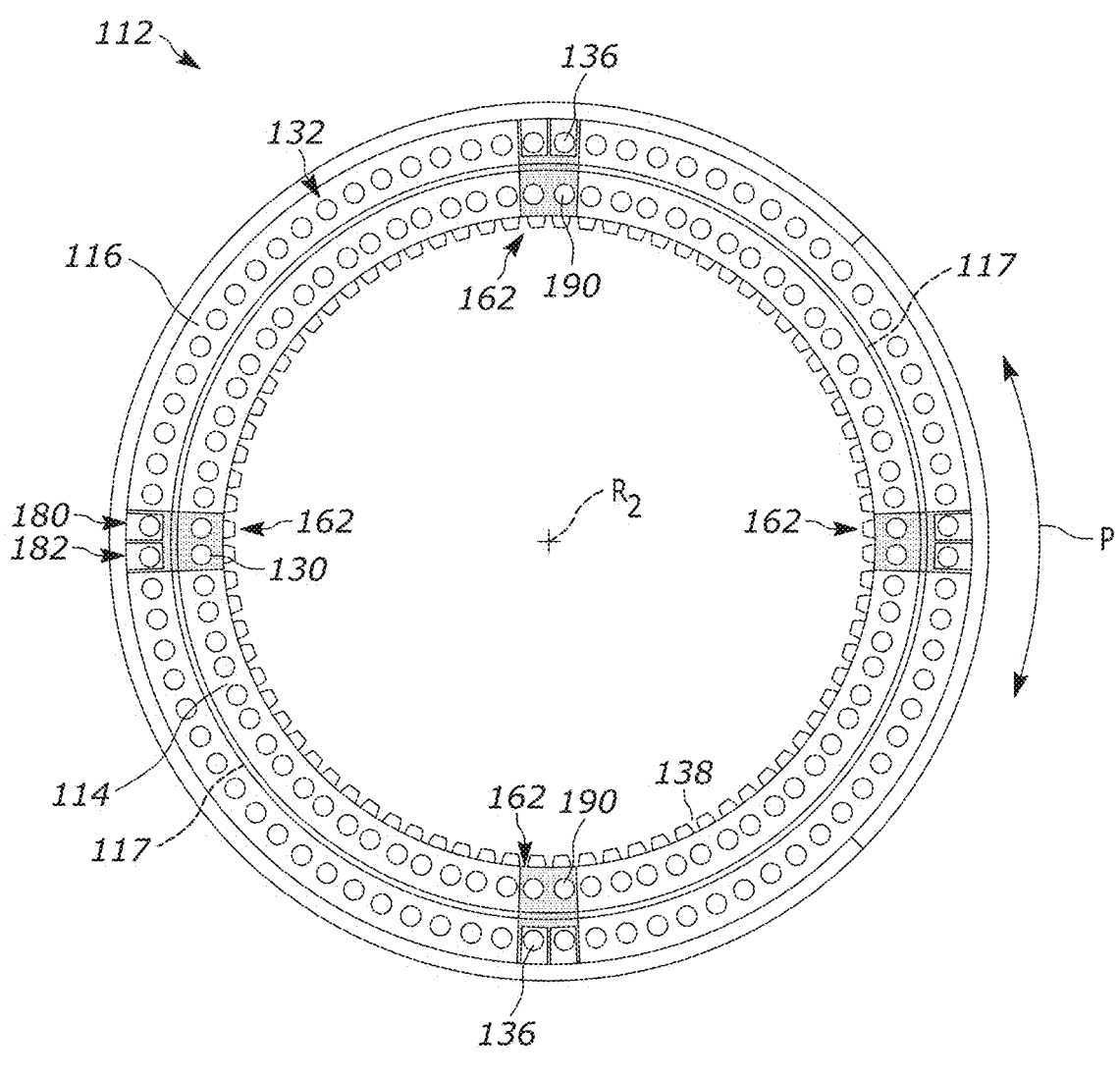
FIG. 7B is a bottom view of the pitch bearing to which multiple temporary support structures in FIG. 6 are fixed.

This process is repeated at one or more intervals around the entire circumference of the bearing 112 until a series of spacers 162 is arranged equidistantly around the axis R2. All remaining bolts 134 are then removed from the inner ring 134. For example, in FIG. 7B four spacers 162 are connected to the outer ring 116 and the blade 110 with the remaining bolts 134 removed from the inner ring 114. It will be appreciated that there can be any even or odd number of spacers 162 secured to both the blade 110 and the hub 108 and arranged about the axis R2. Regardless of the number of spacers 162 used, the end result is that the weight of the blade 110 has been decoupled/removed from the inner ring 114 of the bearing 112. Instead, the spacers 162 transfer the load of the blade 110 to only the outer ring 116. In this manner, the blade 110 is suspended from the hub 108 [with gravity assist] by the spacers 162.

At the same time, the inner ring 114 and the blade 110 are no longer secured together and, thus, the inner ring is rotatable relative to the blade. Consequently, the inner ring 114 can be rotated about the axis R2 to re-index relative to the outer ring 116 and thereby reposition better teeth 138 at the point of engagement with the output gear 144 of the motor 140. The spacers 162 can then be removed by reversing the process outlined above while sequentially replacing the fasteners 190 with the first bolts 134.

All remaining bolts 134 are then re-installed to recouple the blade 110 directly to the inner ring 114. Normal torque transmission from the motor 140 to the teeth 138 is thereby maintained and the wind turbine 10 functionality extended. It will be appreciated that this process can be repeated for each/any bearing 112 needing re-indexing. To this end, once one bearing 112 is re-indexed, the next blade 110 is oriented downward [for gravity assist] and the process repeated until all desired bearings 112 are re-indexed.

Figure 8A:
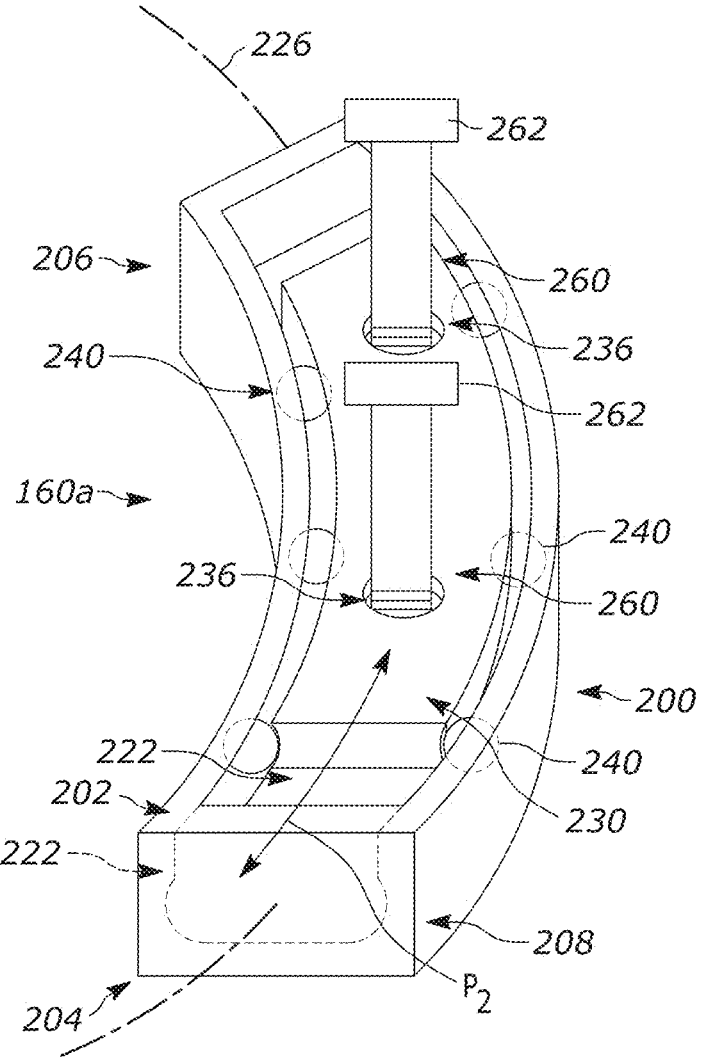
FIG. 8A is a front view of another example temporary support structure.
Figure 8B:
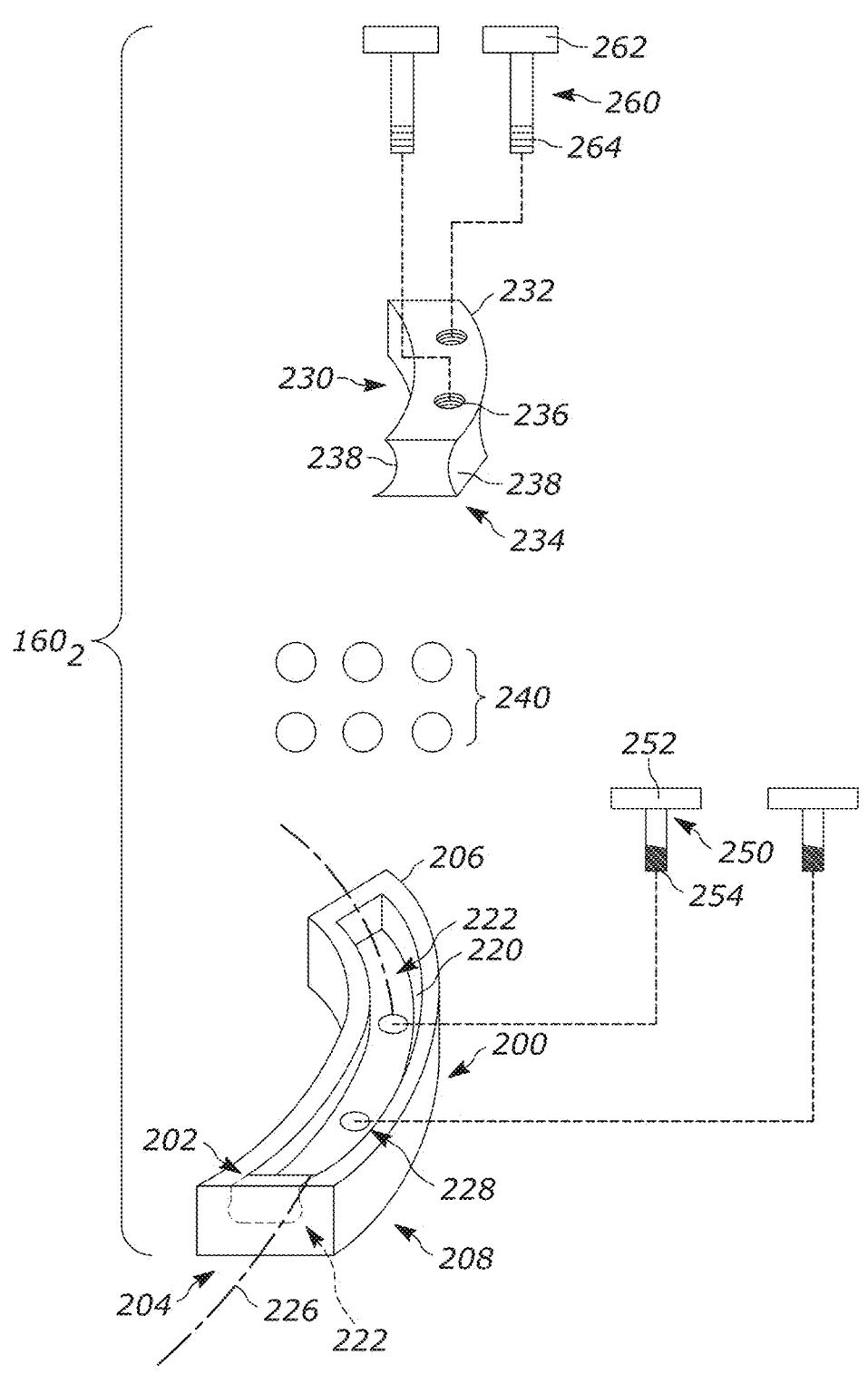
FIG. 8B is an exploded view of the temporary support structure of FIG. 8A.

In another example shown in FIGS. 8A-8B, the temporary support structure is formed as a temporary bearing 160a. The bearing 160a includes an outer ring 200 having a first side 202 and a second side 204. The outer ring 200 extends along an arcuate path from a first end 206 to a second end 208. An inner surface 220 defines a pocket or recess 222 having an arcuate shape and extending along a centerline 226. In one instance, a portion of the inner surface 220 defining the length of the recess 222 has a rounded, e.g., concave, contour. At least one unthreaded passage 228 extends from the bottom (as shown) of the recess 222 to the second side 204 of the outer ring 200.

An inner ring 230 extends along an arc from a first end 232 to a second end 234 and has the same shape as the recess 222 in the outer ring 200. The inner ring 230 has a shorter arc length than the arc length of the recess 222 in the outer ring 200. At least one threaded passage 236 extends through the entire thickness of the inner ring 230. The inner ring 230 includes a pair of outer surfaces 238 extending parallel to one another along the length of the inner ring. The outer surfaces 238 have the same shape as the inner surface 220 of the inner ring 200, e.g., the outer surfaces can be rounded, e.g., concave.

The inner ring 230 is configured to fit within the recess 222 in the outer ring 200 and have a predetermined degree of movement within the recess and along the centerline 226 relative to the outer ring. Relative movement between the inner and outer rings 200, 230 is indicated generally by the arrow P₂ in FIG. 8A.

Rolling elements 240 are provided in the recess 222 and between the surfaces 220 and associated and confronting surfaces 238. In one example, the rolling elements 240 can be formed as spherical balls made of steel and/or other suitable materials. The rolling elements 240 facilitate relative movement between the inner and outer rings 200, 230 while maintaining the inner ring centered in the recess 222.

The bearing 160a also includes a pair of fasteners, namely, first and second temporary fasteners 250, 260. The first fastener 250 has a head 252 and a threaded shaft 254 extending therefrom. The second fastener 260 has a head 262 and a threaded shaft 264 extending therefrom. It will be appreciated that the number of first fasteners 250 will be equal to the number of unthreaded passages 228. The number of second fasteners 260 will be equal to the number of threaded passages 236. That said, more or fewer passages 228 than that shown can be provided in the outer ring 200. More or fewer passages 236 than that shown can be provided in the inner ring 230.

Figure 9A:
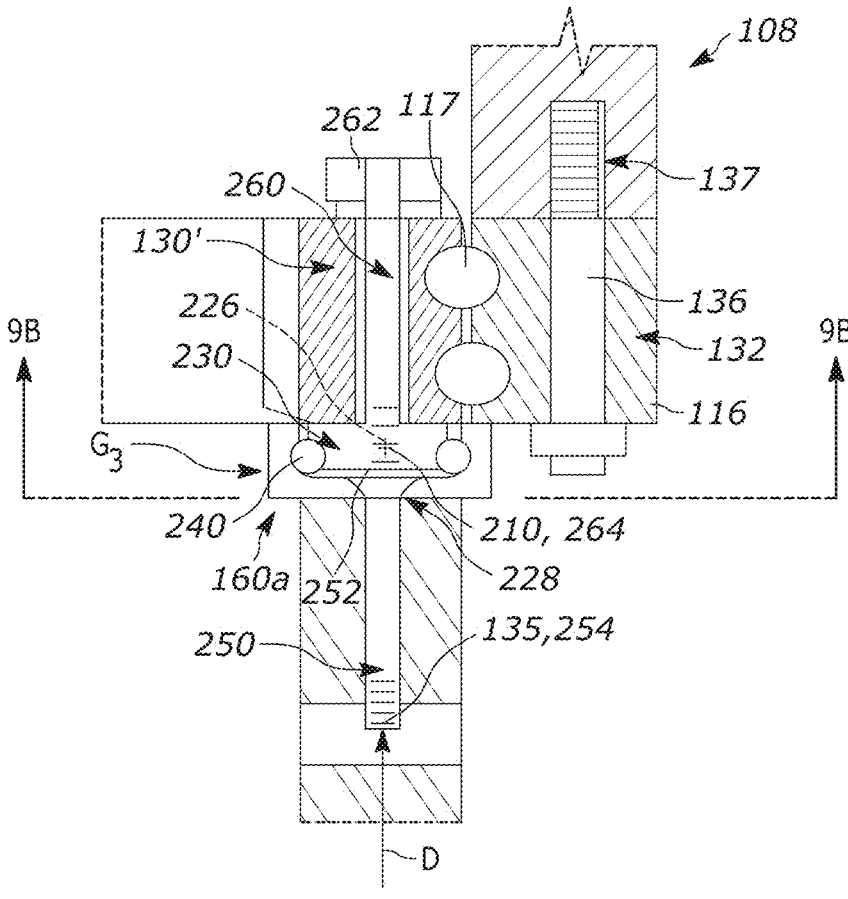
FIG. 9A is a section view of a portion of the wind turbine having the temporary support structure of FIG. 8A secured thereto.

To install the bearing 160a, the process is similar to that described above with the spacer 162. In particular, and referring to FIG. 9A, a series of adjacent bolts 134 are first removed along an arc sufficient to create a longitudinal gap (indicated at "G3") between the inner ring 114 and the blade 110. The size of the gap G3 is sufficient to receive one of the bearings 160a. The bolts 136 are left tightened and thereby still securely fix the outer ring 116 to the hub 108.

The outer ring 200 is inserted into the gap G3 such that each unthreaded passage 228 is aligned with a corresponding one of the openings 130'. The first fasteners 250 are inserted through the unthreaded passages 228 to enable the threaded shafts 254 to fasten to the threaded openings 135 in the blade 110. When this occurs, the heads 252 of the first fasteners 250 bottom out in the recess 222 and pin/fix the outer ring 200 to the blade 110.

The rolling elements 240 are inserted into the recess 222 and rest on the head 252 of the first fastener 250. The inner ring 230 is inserted into the recess 222 such that the passages 228, 236 are aligned with one another. This positions the rolling elements 240 between the inner surface 220 of the outer ring 200 and both outer surfaces 238 of the inner ring 230. In other words, the surfaces 220, 238 cooperate to form a raceway or rolling track for the rolling elements 240 between the inner and outer rings 200, 230.

The second fasteners 260 are passed through openings 130' in the inner ring 114 until the threaded ends 264 engages the threaded passages 236 in the inner ring 230. That said, tightening the second fasteners 220 causes the threaded ends 264 to draw up the inner ring 230 as the threaded engagements therebetween increases. The heads 262 of the second fasteners 260 are configured to be too large to pass into the openings 130' and, thus, continued rotation of the second fasteners draws the entire bearing 160a and blade 110 upwards (as shown) towards the inner ring 230 as indicated at D. It will be appreciated that the second fasteners 260 are rotated until the first side 202 of the outer ring 200 is adjacent to the underside (as shown) of the outer ring 116.

Figure 9B:
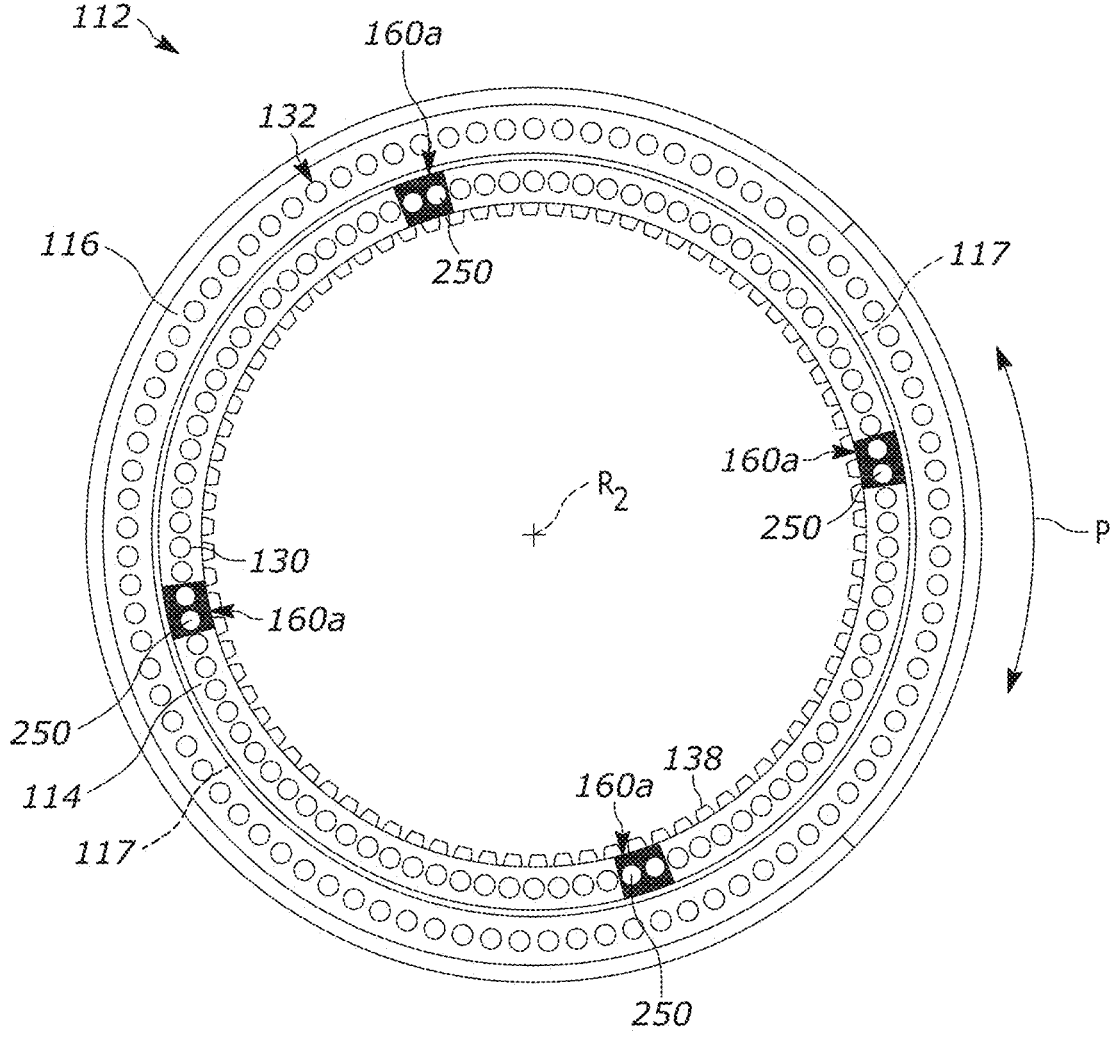
FIG. 9B is a bottom view of the pitch bearing to which multiple temporary support structures in FIG. 8A are fixed.

The creation of the gap G3, insertion of one of the bearings 160a, and tightening of the fasteners 250, 260 is repeated at predetermined locations around the circumference of the inner ring 114. In one example shown in FIG. 9B, four bearings 160a are secured to the inner ring 114 in a circumferential pattern equidistantly spaced about the axis R2. It will be appreciated that more or fewer bearings 160a can be secured to the inner ring 114 in a symmetric or asymmetric pattern.

Regardless, when the bearings 160a are secured to the inner ring 114 the centerlines 226 of the recess are circumferentially aligned with one another about the axis R2. Furthermore, no matter how many bearings 160a are secured to the inner ring 114 all of the remaining bolts 134 are removed along the entire circumference of the inner ring such that the inner ring 114 is no longer rigidly coupled, i.e., fixed to, the blade 110 by the bolts 134. Rather, the blade 110 is suspended from the inner ring 114 (and therefore suspended from the hub 108) with gravity assist by the bearings 160a. In this instance, the weight of the blade 110 is still borne at least partially by the hub 108, but the entire weight of the blade is movable relative to the inner ring 114.

With this in mind, and due to the configuration of the bearings 160a, the inner ring 114, second fasteners 260, and inner rings 230 are movable together as a single, fixed unit relative to the outer rings 200 in the arcuate manner P₂. Additionally, and more importantly, the inner ring 114, second fasteners 260, and inner rings 230 are movable together as a single, fixed unit relative to the outer ring 116 in the arcuate manner P₂ to allow the damaged teeth DT to be indexed out of the way.

The arc lengths of the inner rings 230 and the associated recesses 222 are selected to provide a prescribed amount of relative movement between the inner ring and the outer ring 200 in the arcuate manner P₂. To this end, the degree of travel of the inner ring 230 (and therefore the inner ring 114) is defined between the opposite circumferential ends of the recess 222 in the outer ring 200. In other words, the difference in arc length between the inner ring 230 and the recess 222 dictates how much movement in either direction P₂ the inner ring 114 is capable of moving about the axis R2 relative to the outer ring 116.

In will be appreciated that in another configuration the outer ring 200 can be configured such that the recess 222 extends the entire length of the outer ring (not shown). In other words, the recess 222 is exposed through both the first and second ends 206, 208 of the outer ring 200. In this construction, the inner ring 230 is therefore capable of extend out of the recess 222 at either/both ends 206, 208 of the outer ring 200.

That said, the inner ring 114 can be re-indexed to position less worn/better teeth in the position for engagement by the output gear 144 of the motor 140. Once this is accomplished, the bearing 160a installation process is reversed until all the bearings are removed and the bolts 134 returned to their original positions securing the inner ring 114 to the blade 110 to prevent relative movement therebetween. All remaining bolts 134 are re-installed to recouple the blade 110 directly to the inner ring 114. Normal torque transmission from the motor 140 to the teeth 138 is thereby maintained and the wind turbine 10 functionality extended. It will be appreciated that this process can be repeated for each/any bearing 112 needing re-indexing. To this end, once one bearing 112 is re-indexed, the next blade 110 is oriented downward [for gravity assist] and the process repeated until all desired bearings 112 are re-indexed.

Although the bearing 160a is illustrated in FIGS. 8A-9B as being a self-contained unit, it will be appreciated that other bearing configurations are contemplated by those skilled in the art. To this end, the outer ring 200 could be fixed to the inner ring 114 and a bearing inner ring fixed to the blade 110 and extending into the outer ring. In this configuration, the rolling elements 240 are positioned within the recess 222 and provide a rolling interface between the bearing inner and outer rings to allow for rotation of the inner ring 114 relative to the blade 110 (not shown).

Figure 10:
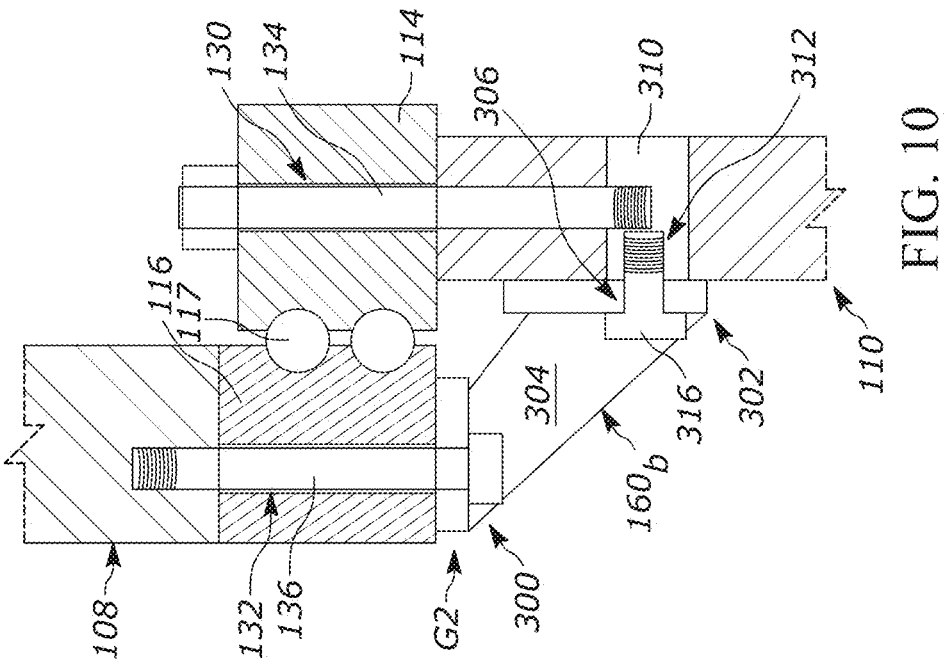
FIG. 10 is a section view of a portion of the wind turbine having yet another temporary support structure secured thereto.

In another example shown in FIG. 10, the temporary support structure is formed as an angled brace 160b. The brace 160b includes planar first and second ends 300, 302. An angled portion 304 extends between the ends 300, 302. The first and second ends 300, 302 can, for example, extend perpendicular to one another.

In this example, the bolt 134 is threaded into a barrel nut 310 provided within the blade 110. The barrel nut 310 extends to and is exposed from the outside of the blade 110 facing in the direction of the outer ring 116.

To install the brace 160b, a series of bolts 136 are loosened sufficient to create the gap G2 between the heads of the bolts and the outer ring 116. The gap G2 in this instance is large enough to accommodate the first end 300 of the brace 160b. It will be appreciated that the first end 300 can span one or more than one opening 132 in the outer ring 116 and, thus, a commensurate number of bolts 136 are loosened to accommodate the first end 300 accordingly. In this instance, the first end 300 spans two bolts 136 and, thus, two bolts are loosened to form the gap G2.

When the first end 300 is provided in the gap G2, the second end 302 abuts the outward facing surface of the blade 110 with the second end being aligned with the barrel nuts 310. In this instance, the second end 302 is aligned with/covers two barrel nuts 310. In any case, the bolts 136 are then tightened to pin/fix the first end 300 between the bolts and the outer ring 116.

An unthreaded opening 306 is formed through the second end 302 in a direction aligned with the approximate center of the barrel nut 310. A threaded opening 312 is formed in the barrel nut 310 aligned with the unthreaded opening 306. This process is repeated for each of the barrel nuts 310 covered by the second end 302. Threaded fasteners 316 are then extended through the unthreaded openings 306 and engaged with the threaded openings 312 in the barrel nuts 310. The fasteners 316 are tightened until the second end 300 is pinned/fixed between the head of the fasteners and the blade 110.

This process is repeated at one or more intervals around the entire circumference of the bearing 112 until a series of braces 160b are arranged equidistantly around the axis R2. All of the bolts 134 are then removed from the inner ring 134 (not shown). For example, in FIG. 10 four braces 160b are connected to the outer ring 116 and the blade 110 similar to the configuration shown in FIGS. 7B and 9B. It will be appreciated that there can be any even or odd number of braces 160b secured to both the blade 110 and the outer ring 116 and arranged about the axis R2.

Regardless of the number of braces 160b used, the end result is that the weight of the blade 110 has been decoupled/removed from the inner ring 114 of the bearing 112. Instead, the braces 160b transfer the load of the blade 110 to only the outer ring 116, thereby suspending the blade 110 from the outer ring. Consequently, the weight of the blade 110 is suspended from the hub 108 in a manner that allows the bearing 114 to be re-indexed.

That said, the inner ring 114 can be re-indexed to position less worn/better teeth in the position for engagement by the output gear 144 of the motor 140. Once this is accomplished, the brace 160b installation process is reversed until all the braces are removed and the bolts 134 returned to their original positions securing the inner ring 114 to the blade 110 and thereby recoupling the blade 110 directly to the inner ring. Normal torque transmission from the motor 140 to the teeth 138 is thereby maintained and the wind turbine 10 functionality extended. It will be appreciated that this process can be repeated for each/any bearing 112 needing re-indexing. To this end, once one bearing 112 is re-indexed, the next blade 110 is oriented downward [for gravity assist] and the process repeated until all desired bearings 112 are re-indexed.

Figure 11:
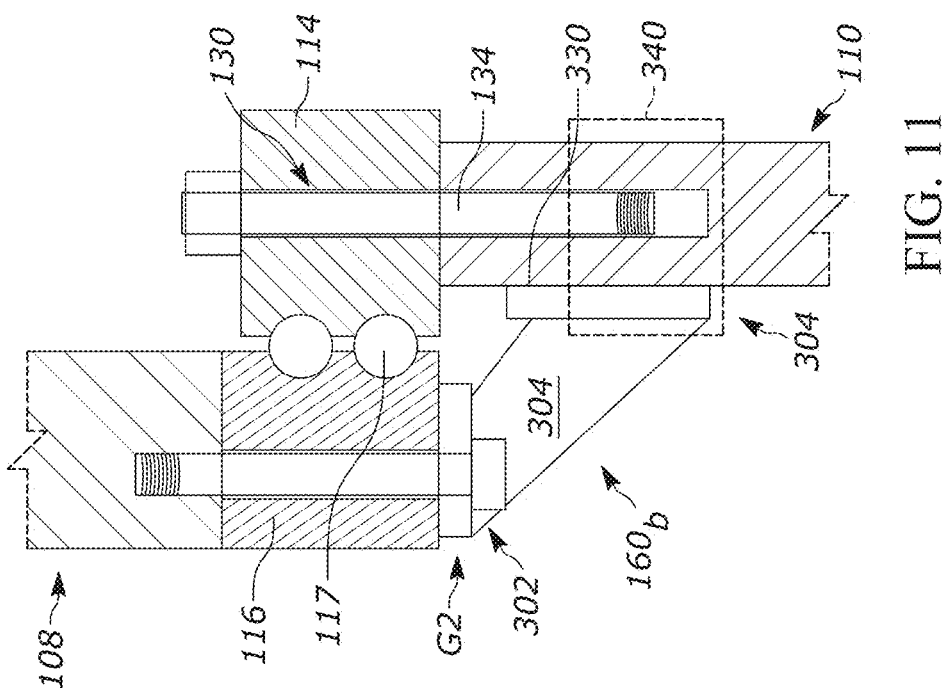
FIG. 11 is a section view of a portion of the wind turbine having yet another temporary support structure secured thereto.

In another configuration shown in FIG. 11, the brace 160b is identical but the blade 110 is not connected to the inner ring 114 via barrel nuts 310 and, thus, a different method is used to secure the second ends 302 to the blade to decouple the inner ring 114 from the blade. To this end, once the second ends 302 abut the outward facing surface of the blade 110, the second ends are bonded directly to the blade (indicated at 330) using for example, an adhesive. Alternatively, a circumferential band (illustrated in phantom at 340) is extended around the blade 110 and the second end 302 and tightened until the second end is fixed to the blade. In each instance, the bolts 134 are then removed to decouple the inner ring 114 from the blade 110 to allow re-indexing of the inner ring.

This removal of the bolts 134 transfers the load of the blade 110 to only the outer ring 116, thereby suspending the blade 110 from the outer ring. Consequently, the weight of the blade 110 is suspended from the hub 108 in a manner that allows the bearing 114 to be re-indexed. Once the inner ring 114 is re-indexed, the bracket 160b installation process is reversed until all the bearings are removed and the bolts 134 returned to their original positions securing the inner ring 114 to the blade 110 to prevent relative movement therebetween. All remaining bolts 134 are re-installed to recouple the blade 110 directly to the inner ring 114.

Normal torque transmission from the motor 140 to the teeth 138 is thereby maintained and the wind turbine 10 functionality extended. It will be appreciated that this process can be repeated for each/any bearing 112 needing re-indexing. To this end, once one bearing 112 is re-indexed, the next blade 110 is oriented downward [for gravity assist] and the process repeated until all desired bearings 112 are re-indexed.

Although the temporary support structures 160, 160a, 160b are shown in use with the pitch bearing 112 one having ordinary skill in the art will readily understand that any bearing in the wind turbine 100 can be repaired with the temporary support structures shown and described therein, such as but not limited to the yaw bearing and/or drive bearing in accordance with the present invention.

Figure 12:
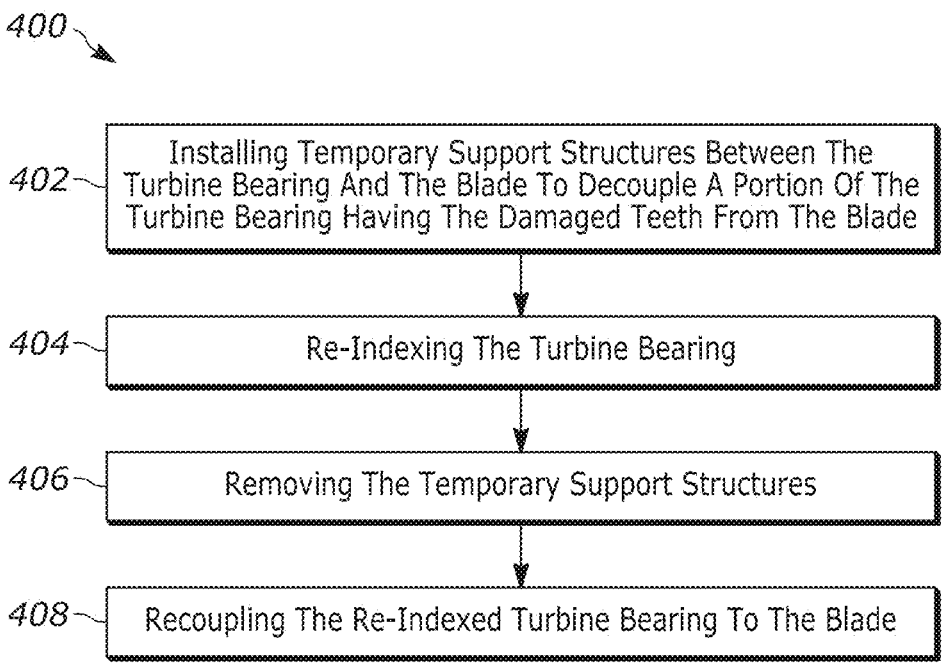
FIG. 12 is a flow chart illustrating the steps of installing the temporary support structure on a damaged bearing.

FIG. 12 is a flow chart 400 illustrating the steps of installing a temporary support structure 160, 160a, 160b on the bearing 112 of a wind turbine 100. At step 402, the temporary support structures are installed between the turbine bearing and the blade to decouple a portion of the turbine bearing having the damaged teeth from the blade. At step 404, the turbine blade is re-indexed. At step 406, the temporary support structures are removed. At step 408, the re-indexed turbine bearing is re-coupled to the blade The temporary support structures of the present invention are advantageous in that they provide an efficient, less expensive means of addressing damaged bearing teeth than current solutions. To this end, providing temporary support structures that can be readily adapted to the tooth issue faced in a particular bearing and that can be readily installed thereon with minimal effort alleviates the need to remove the bearing, remove the problematic teeth altogether or apply expensive and time consuming "dentures" to the damaged teeth.

All the currently existing components within the hub can be maintained in their current positions while the temporary support structures are simply secured in position in the appropriate locations to decouple the turbine blade from the bearing to enable re-indexing of the worn bearing teeth relative to the turbine blade, all without the use of a crane or heavy machinery. More specifically, the temporary support structures shown and described herein all allow the blade to be suspended with the assist of gravity from the hub and a portion of the bearing to be re-indexed. That said, the entire weight of the blade is not removed from the hub (as would be the case with a crane) but instead advantageously shifted/re-distributed in a manner that allows all the bearings to be re-indexed without physically removing the blade from the wind turbine.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to include all such alterations, modifications and variations that fall within the spirit and scope of the appended claims.

What is claimed is:

1. A method for re-indexing a wind turbine bearing coupled to a blade and having damaged teeth driven by a motor, comprising:
   installing spacers between the turbine bearing and the blade to decouple a portion of the turbine bearing having the damaged teeth from the blade and enable re-indexing of the turbine bearing, wherein each of the spacers is formed as a single plate contacting first fasteners extending from the blade as well as second fasteners extending from the turbine bearing;
   re-indexing the turbine bearing;
   removing the spacers; and
   recoupling the re-indexed turbine bearing to the blade.

2. The method of claim 1 further comprising connecting each of the spacers to first fasteners extending from the blade as well as to second fasteners extending from the turbine bearing.

3. The method of claim 2, wherein the spacers are pinned between the turbine bearing and the second fasteners extending from the turbine bearing.

4. The method of claim 2, wherein the spacers include openings for receiving the first fasteners and lateral openings for receiving the second fasteners.

5. The method of claim 1, wherein the turbine bearing comprises one of a pitch bearing, a drive bearing, and a yaw bearing on the wind turbine.

6. The method of claim 1, wherein the portion of the turbine bearing having the damaged teeth is an inner ring of the turbine bearing.

7. The method of claim 1, wherein the portion of the turbine bearing having the damaged teeth is an outer ring of the turbine bearing.

8. The method of claim 1, further comprising removing fasteners securing the portion of the turbine bearing to the blade.

9. The method of claim 1, wherein the spacers are installed between the turbine bearing and the blade such that at least a portion of a weight of the blade is borne by the turbine bearing.

10. The method of claim 1, wherein each of the spacers extends radially between the turbine bearing and the blade.

11. A method for re-indexing a wind turbine bearing coupled to a blade and having damaged teeth driven by a motor, comprising:

installing temporary bearings comprising rolling elements between the turbine bearing and the blade to decouple a portion of the turbine bearing having the damaged teeth from the blade, wherein each of the temporary bearings comprises an inner ring secured to the portion of the turbine bearing and an outer ring secured to the blade with the inner ring being movable relative to the outer ring to enable re-indexing of the turbine bearing;

re-indexing the turbine bearing;

removing the temporary bearings; and recoupling the re-indexed turbine bearing to the blade.

12. The method of claim 11, wherein the turbine bearing comprises one of a pitch bearing, a drive bearing, and a yaw bearing on the wind turbine.

13. The method of claim 11, wherein both the inner ring and the outer ring are arc shaped and circumferentially aligned with one another relative to a rotation axis of the turbine bearing.

14. The method of claim 11, wherein the portion of the turbine bearing having the damaged teeth is an inner ring of the turbine bearing.

15. The method of claim 11, further comprising removing fasteners securing the portion of the turbine bearing to the blade.

16. A method for re-indexing a wind turbine bearing coupled to a blade and having damaged teeth driven by a motor, comprising:

installing temporary braces between an outer ring of the turbine bearing and the blade to decouple a portion of the turbine bearing having the damaged teeth from the blade, wherein each of the temporary braces comprises a first end secured to the outer ring, a second end secured to the blade, and an angled portion extending between the first and second ends, wherein the second end is secured to the blade by barrel nuts provided within the blade or by bonding the second end to an outer surface of the blade;

re-indexing the turbine bearing;

removing the temporary braces; and recoupling the re-indexed turbine bearing to the blade.

17. The method of claim 16, wherein the turbine bearing comprises one of a pitch bearing, a drive bearing, and a yaw bearing on the wind turbine.

18. The method of claim 16, wherein the portion of the turbine bearing having the damaged teeth is an inner ring of the turbine bearing.

19. The method of claim 16, further comprising removing fasteners securing the portion of the turbine bearing to the blade.

* * * * *